United States Patent [19]

Schreiber et al.

[11] Patent Number: 5,103,718

[45] Date of Patent: Apr. 14, 1992

[54] APPARATUS AND METHOD FOR PROCESSING OF A FOOD PRODUCT

[75] Inventors: James D. Schreiber, Sun Prairie; Charles A. McClain, Madison; David E. Lukens, Lodi, all of Wis.

[73] Assignee: DEC International, Inc., Lodi, Wis.

[21] Appl. No.: 534,130

[22] Filed: Jun. 6, 1990

Related U.S. Application Data

[63] Continuation-in-part of Ser. No. 481,998, Feb. 16, 1990, abandoned.

[51] Int. Cl.⁵ .................. A23L 1/01; B65G 17/00
[52] U.S. Cl. .................. 99/443 C; 99/448; 99/467; 198/561; 198/579; 198/685
[58] Field of Search ............ 99/477, 485, 443 C, 99/352, 483, 482, 535, 534, 355, 448, 386, 426, 441, 467; 198/561, 579, 602, 682, 683, 685, 680

[56] References Cited

U.S. PATENT DOCUMENTS

| | | |
|---|---|---|
| 650,877 | 6/1900 | Taliaferro . |
| 1,500,776 | 7/1924 | Spooner . |
| 1,585,234 | 5/1926 | Cowley ................. 198/683 X |
| 1,768,493 | 6/1930 | Roddy . |
| 1,810,418 | 6/1931 | Francis ................. 198/683 |
| 2,456,224 | 12/1948 | Sullivan . |
| 2,505,973 | 5/1950 | Julian . |
| 2,708,999 | 5/1955 | Rush ................. 198/682 |
| 2,952,351 | 9/1960 | Stone ................. 198/680 X |
| 3,204,844 | 9/1965 | Wallace . |
| 3,276,352 | 10/1966 | Allen et al. . |
| 3,713,846 | 1/1973 | Turner et al. . |
| 4,081,564 | 3/1978 | Borsuk . |
| 4,364,309 | 12/1982 | Gorbatov et al. . |
| 4,532,858 | 8/1985 | Hershfeld . |

FOREIGN PATENT DOCUMENTS

1240469 5/1967 Fed. Rep. of Germany ...... 198/683

Primary Examiner—Harvey C. Hornsby
Assistant Examiner—Scott J. Haugland
Attorney, Agent, or Firm—Andrus, Sceales, Starke & Sawall

[57] ABSTRACT

An apparatus and method for processing a food product. A series of processing cabinets are each provided with an inlet and an outlet in one of the cabinet side walls adjacent an end wall. The product is carried by a series of individual product carriers, which are capable of turning relative to the rail. The carriers pass through the cabinet inlets, and are turned relative to the rail thereafter so as to pass through the cabinets in a closely packed arrangement. As the carriers approach the opposite end wall of the cabinet, the carriers are again turned so as to exit the cabinet in a direction perpendicular to the longitudinal axis of the cabinet.

15 Claims, 7 Drawing Sheets

APPARATUS AND METHOD FOR PROCESSING OF A FOOD PRODUCT

CROSS-REFERENCE TO RELATED APPLICATION

This application is a continuation-in-part of application Ser. No. 07/481,998 filed Feb. 16, 1990, abandoned.

BACKGROUND AND SUMMARY

This invention relates to a processing system for a food product, and more particularly to a meat processing arrangement in which the meat product is sequentially moved through processing chambers.

Various systems are known for processing food products which are suspended from carrier structures. One such system is a continuous or in-line processing system, which provides a product inlet at one end and a product outlet at the other. Between the inlet and the outlet are various processing zones or chambers. For example, the product may first be supplied to a smoke zone, and then discharged therefrom into a cook zone. From the cook zone, the product passes into a hot water zone, and thereafter to a brine chill zone prior to discharge. This type of system is known for its simplicity in design, dependable performance and easy operation. However, this type of system is also subject to product drift, in that it is difficult to isolate the zones from each other by providing a discrete borderline or boundary between the zones. Additionally, installation of this type of system is limited to an area having a length sufficient to accommodate the length of the physical components of the system.

The present invention has as its object to provide a processing system having greater flexibility in layout than previous systems, and also to provide discrete boundaries between the various zones of the processing operation.

In accordance with the invention, a food product processing system comprises a plurality of processing chambers, each chamber having a product inlet and a product outlet. The chambers are arranged in a non-linear fashion, and are isolated from each other such that the outlet of one chamber is spaced from the inlet of the chamber downstream therefrom. Product advancing means is provided for advancing the food product through the plurality of processing chambers and for providing movement of the food product through the space between the outlet of one of the chambers and the inlet of the chamber downstream therefrom. In a preferred embodiment, each chamber has its product inlet and its product outlet formed in a sidewall of the chamber, and the outlet of one chamber is preferably substantially aligned with the inlet to the downstream chamber. The product is carried on a plurality of individual product carriers, which are suspended from an overhead rail. Each product carrier has a wheeled trolley assembly movably mounted on the rail. The advancing means preferably comprises a chain drive system which moves the suspended product carriers on the rail. The chain drive system preferably includes a plurality of individual conveyances or loops, each including a drive run located over the rail and a return run spaced laterally from the drive run. The loops are preferably arranged such that a single drive assembly is disposed between and drives two loops, one of which advances the product carriers at a relatively slow speed through a processing chamber, and the other of which advances the product carriers between processing chambers at a relatively fast speed. The rail is arranged in a continuous loop, passing through the various processing chambers. In a preferred embodiment, the rail passes by an unloading area after discharge from the final processing chamber, and by a loading area prior to entry into the inlet of the initial processing chamber. Each product carrier preferably includes an upper product carrying area and a lower product carrying area. The elevation of the rail preferably varies adjacent the loading area so as to accommodate loading of the product onto the upper and lower product carrying areas. Preferably, a carrier washing chamber is arranged between the final processing chamber and the initial processing chamber. The carriers are passed through the washing chamber after discharge from the final chamber and prior to entry into the initial chamber.

In advancing the product through the various chambers, the rail preferably enters each chamber through its sidewall in a direction substantially perpendicular to the longitudinal axis of the chamber. Inside the chamber, the rail is preferably disposed substantially parallel to the longitudinal axis of the chamber, and the individual product carriers follow the path of the rail. To achieve maximum product density within the interior of each chamber, the product trees are capable of turning relative to the rail so as to remain substantially perpendicular to the longitudinal axis of the chamber during entry into the chamber, passage of the product carriers through the chamber, and during discharge of the carriers from the chamber.

The invention also contemplates a method of processing a food product, substantially in accordance with the foregoing description.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
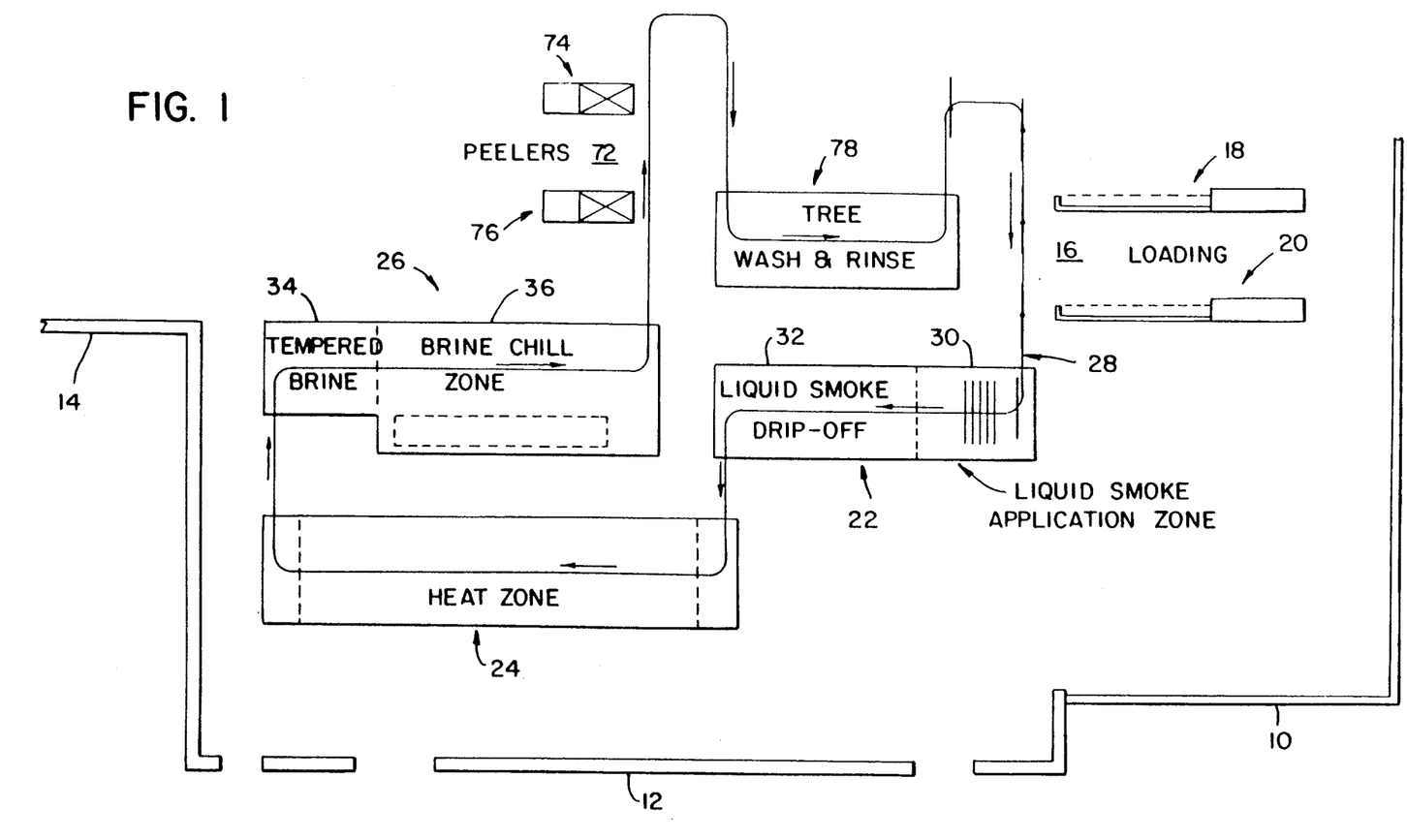
FIG. 1 is a plan view showing a proposed processing system constructed according to the invention.

As shown in FIG. 1, a food processing system according to the invention is shown as housed within a building, certain walls of which are shown at 10, 12 and 14, defining a bay in which the system of the invention is located.

The system generally includes a loading area 16, and a pair of machines 18, 20 are located at loading area 16 which output a string of raw meat products such as hot dogs or sausages, contained within a continuous string of casings.

The system generally comprises a series of cabinets 22, 24 and 26, with an overhead conveying system schematically represented at 28 intertwined through cabinets 22, 24 and 26.

Each of cabinets 22, 24 and 26 performs a distinct processing step for processing the meat product. In particular, cabinet 22 provides a zone 30 for applying smoke to the product. Cabinet 24 provides a heat zone for cooking the product. Cabinet 26 provides an initial area 34 in which the product is exposed to a tempered brine solution, and an area 36 in which the product is exposed to a chilled brine solution.

Figure 2:
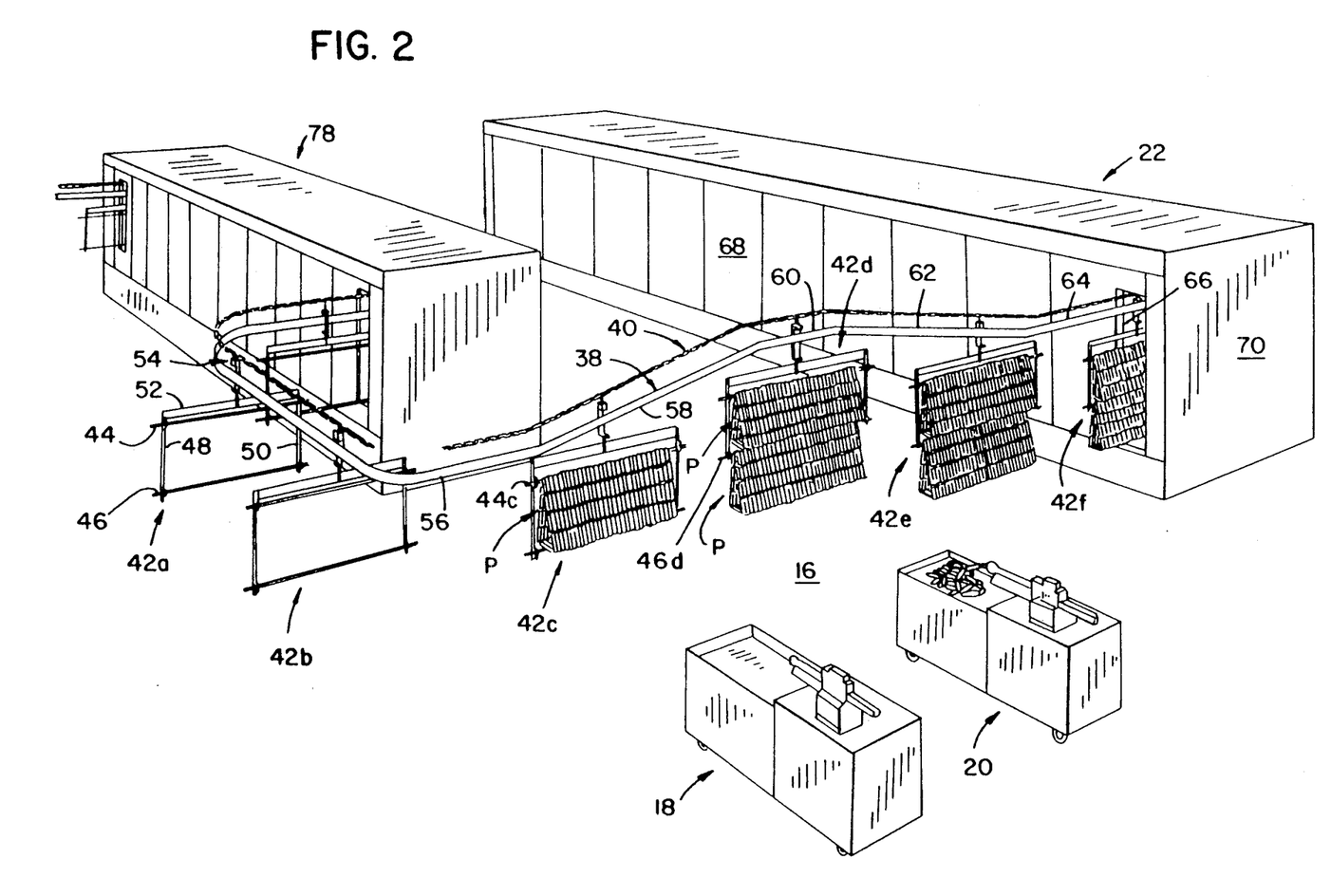
FIG. 2 is an isometric view of a portion of the processing system of FIG. 1.

As shown in FIG. 2, overhead conveying system 28 generally includes a rail 38 having a chain 40 disposed thereabove. Chain 40 is interconnected with a suitable driving sprocket arrangement, for providing movement of chain 40 above rail 38 along the length of rail 38. It is understood that chain 40 may comprise a series of chain segments.

A plurality of product carrying trees, shown at 42a–42f, are suspended from rail 38. Referring to tree 42a, each tree includes an upper stick 44 and a lower stick 46, which extend between vertical supports 48, 50. A cross-member 52 is provided between vertical supports 48, 50.

Referring again to tree 42a, each tree is mounted to a trolley assembly 54, which is provided with one or more wheels which ride on top of rail 38. An engagement system is provided between the trolleys (54) and chain 40, so that movement of chain 40 above rail 38 engages the trolleys (54) for moving the product trees 42a–42f along rail 38.

Rail 38 includes an upstream lower portion 56, an inclined portion 58, an upper portion 60, and inclined portion 62 and a downstream lower portion 64. Referring to tree 42c, it is seen that its upper stick 44c is loaded with a string of linked meat product, shown at P. This loading operation occurs while tree 42c is on upstream lower portion 56 of rail 38, with stick 44c being loaded from product output from machine 18. As chain 40 continues its movement so as to move the product trees toward cabinet 22, the trees travel up inclined portion 58 of rail 38 and to upper portion 60, where tree 42d is shown in FIG. 2. When tree 42d is in this position, the elevation at which its lower stick 46d is to be placed onto the tree is raised, thus making it easier for the operator to load stick 46d with product output from machine 20 and to place the loaded stick 46d onto tree 42d. After the tree is fully loaded, it travels down inclined area 62, where tree 42e is shown, to lower downstream portion 64.

As also shown in FIG. 2, cabinet 22 is provided with an inlet opening 66 at the end of its sidewall 68 adjacent an end wall 70. The product trees enter cabinet 22 through opening 66, as shown, with rail 38 at lower downstream portion 64 extending through opening 66 into the interior of cabinet 22. As shown in FIG. 1, cabinet 22 is provided with a discharge outlet in the sidewall opposite sidewall 68 adjacent the end wall opposite end wall 70.

Throughout most of the length of cabinet 22, rail 38 is oriented parallel to and coincident with the longitudinal axis of cabinet 22. At the entrance of rail 38 into cabinet 22 at inlet 66, rail 38 is oriented substantially perpendicular to the longitudinal axis of cabinet 22. At its outlet from cabinet 22, rail 38 is also oriented perpendicular to the longitudinal access of cabinet 22.

This feature of the invention is also shown in FIG. 1. Like cabinet 22, cabinets 24 and 26 also have their inlet and outlet openings formed in the side walls of the cabinets, with the rail extending through the inlet and outlet openings being perpendicular to the longitudinal axis of the cabinet, and a portion between the inlet and the outlet extending along the longitudinal axis of the cabinet.

The outlet of cabinet 22, as well as the inlets and outlets of cabinets 24 and 26, are similar in placement and construction to inlet 66 shown with respect to cabinet 22.

As shown in FIG. 1, trees 42 remain in a substantially constant orientation relative to the cabinets, such as 22, during entry into the cabinets, passage through the cabinets and discharge from the cabinets. Trees 42 turn relative to conveyor assembly 28 after entry into the cabinets, such as 22, and are conveyed through the cabinets so as to be relatively closely spaced during passage therethrough to provide maximum utilization of the interior cabinet space, and thereby efficient processing. As the trees approach the end wall of the cabinet adjacent the discharge outlet, the trees again turn relative to the conveyor assembly, thereby allowing them to pass sideways through the relatively narrow discharge opening in the side wall of the cabinet. Conveyor assembly 28 then moves the trees across the space between the outlet of one cabinet and the inlet of the downstream cabinet, where the same action again occurs.

After the product has passed through cabinets 22, 24 and 26 as described, it is discharged from the outlet of cabinet 36 to an unload station, shown at 72 in FIG. 1. A pair of peeling machines 74, 76 are provided at unload station 72. The product is removed from the product trees at station 72 and fed into peelers 74 and 76, for removing the casings from the product in preparation for final packaging. Like the elevating and de-elevating arrangement of rail 38 at load station 16, a similar arrangement is provided at unload station 72 for accommodating unloading of the product from the product trees.

After the product trees have been emptied, the sticks are returned to the product trees and the trees move through a wash and rinse cabinet, shown in FIGS. 1 and 2 at 78. Within cabinet 78, the product trees are washed and rinsed in preparation for another processing cycle, and the manner in which the product trees pass through cabinet 78 is similar to that of cabinets 22, 24 and 26, in that the trees turn relative to the rail after entry into cabinet 78 and prior to discharge therefrom. Once the washed and rinsed product trees are discharged from cabinet 78, they are again routed to load station 16 where product is again loaded onto the product trees in preparation for processing, as described above.

With the invention as shown and described, optimal utilization of the plant floor space is achieved, and the arrangement of the processing system can be designed so as to accommodate the floor space available. By turning the product trees relative to the rail after the trees enter the cabinets, maximum utilization of the interior cabinet volume is achieved.

Figures 3, 8:
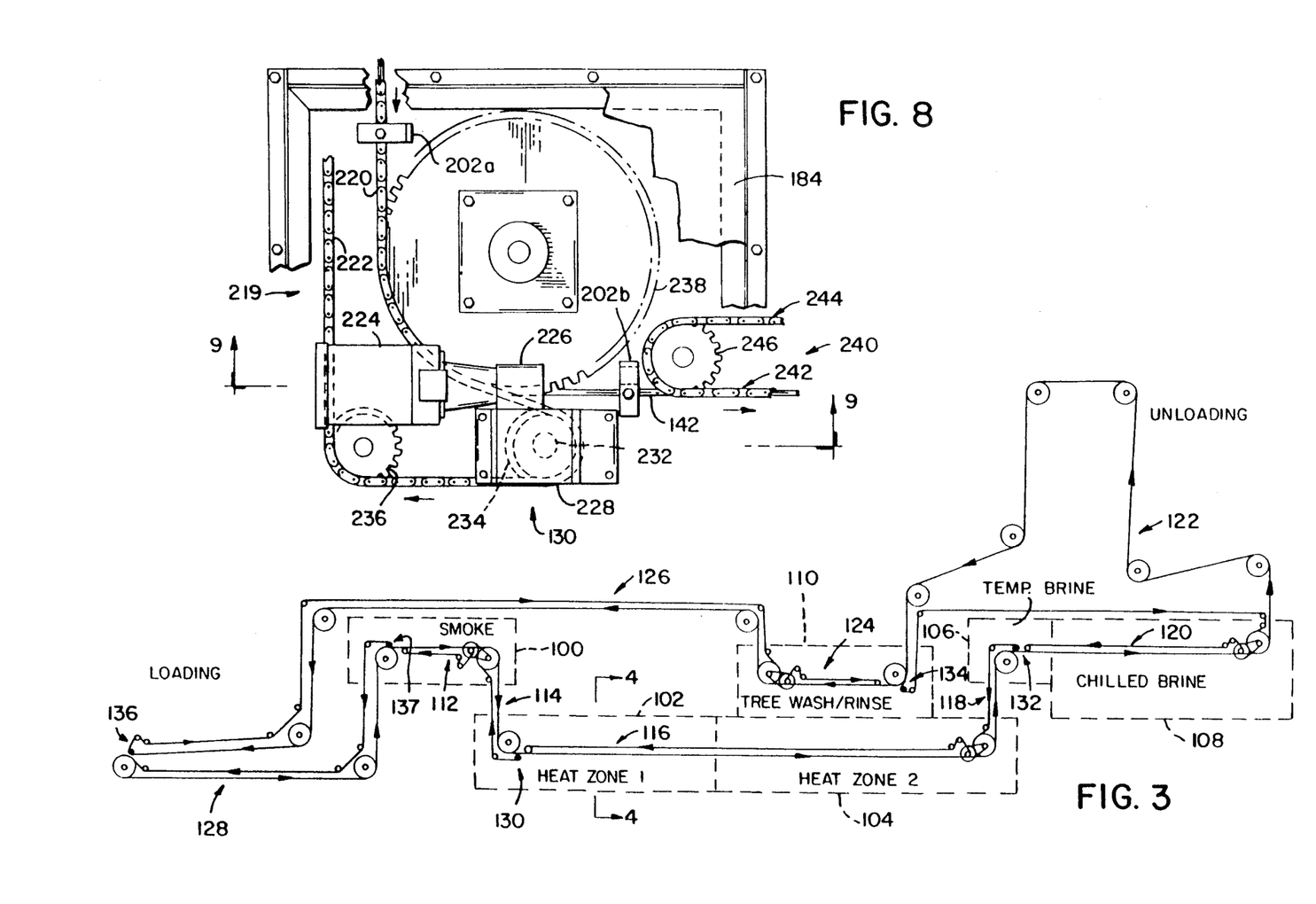
FIG. 3 is a schematic plan view showing an actual embodiment of a processing system constructed according to the invention.
FIG. 8 is an enlarged plan view, with portions broken away, showing an area at the downstream end of one conveyor loop and the upstream end of the adjacent downstream conveyor loop.

FIGS. 3-11 illustrate in greater detail a system for carrying out the principles shown in FIGS. 1 and 2. Referring to FIG. 3, a food product processing system comprises a smoke application chamber 100, a first heat chamber 102, a second heat chamber 104, a tempered brine chamber 106, a chilled brine chamber 108, and a tree washing and rinsing chamber 110. The drive system for advancing the product carriers comprises a rail, as disclosed in FIGS. 1 and 2, and a plurality of conveyor loops shown generally at 112, 114, 116, 118, 120, 122, 124, 126 and 128. Loops 112-128 each include a drive chain having a drive run and a return run, with each run being disposed in a substantially horizontal plane. A series of drive assemblies shown at 130, 132, 134, 136 and 137 are provided for imparting movement to the drive chains defining loops 112-128. Rail 56 is mounted below the drive run of each of conveyor loops 112-128.

Drive assembly 130 is provided for imparting movement to conveyor loops 112, 114. Similarly, drive assembly 132 imparts movement to loops 116, 118; drive assembly 134 imparts movement to loops 120, 122; drive assembly 136 imparts movement to loops 124, 126 and drive assembly 137 imparts movement to loop 128.

Figure 4:
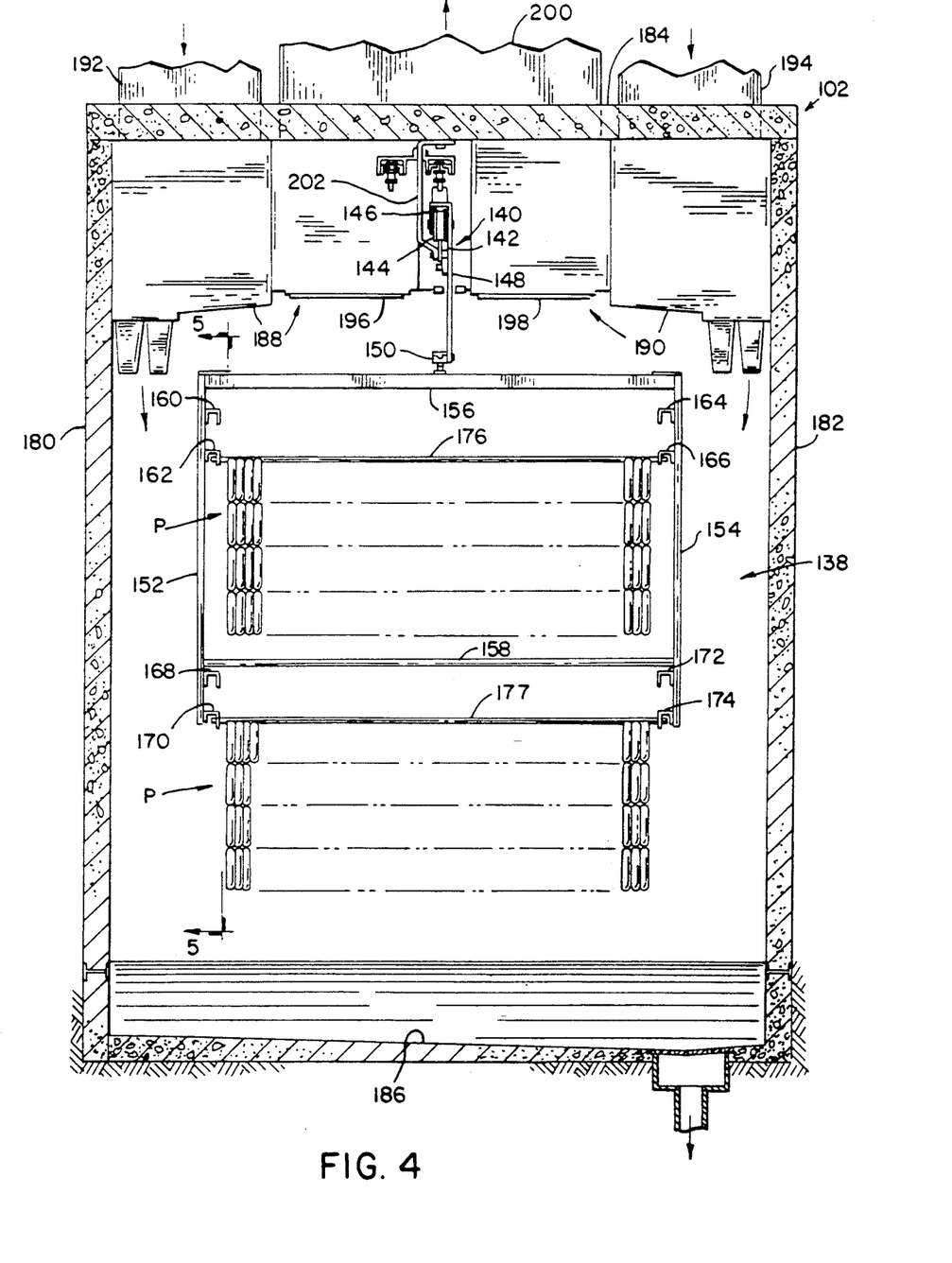
FIG. 4 is a transverse sectional view taken generally along line 4—4 of FIG. 3.

Referring to FIG. 4, a product tree 138 is shown suspended from a trolley assembly, shown generally at 140. Trolley assembly 140 is movably mounted on the rail, shown at 142, by means of a wheel 144 rotatably mounted between a pair of vertical members shown at 146, 148, provided at the upper portion of trolley assembly 140. Vertical member 148 extends downwardly from the upper portion of trolley assembly 140, and a base member 150 is connected at the lower end of vertical member 148.

Product tree 138 includes a pair of spaced vertical side members 152, 154. An upper cross member 156 extends between the upper ends of side members 152, 154, and a lower cross member 158 extends between side members 152, 154 toward their lower ends. A pair of upper brackets 160, 162 are mounted to side member 152 toward its upper end, and a pair of lower brackets 164, 166 are mounted to side member 154 toward its upper end. Brackets 160, 162 and 164, 166 are arranged so as to face each other.

In a similar manner, facing pairs of brackets 168, 170 and 172, 174 are mounted toward the lower ends of vertical members 152, 154, respectively.

A loaded upper product stick 176 extends between brackets 162, 166, and a loaded lower product stick 177 extends between brackets 170, 174. Product sticks 176, 177 are loaded with the meat product being processed, shown generally at P, which may be any meat product such as hot dogs, sausages or the like which are encased during processing in linked casings, and subsequently stripped of their casings after processing. Product sticks 176, 177 are loaded with the linked product P at the output of a stuffing machine, as is known in the art.

When sticks 176, 177 are loaded, they are suspended from brackets 162, 166 and 170, 174, respectively. When sticks 176, 177 are empty, they are placed in brackets 160, 164 and 168, 172, respectively.

Figures 5, 6, 7:
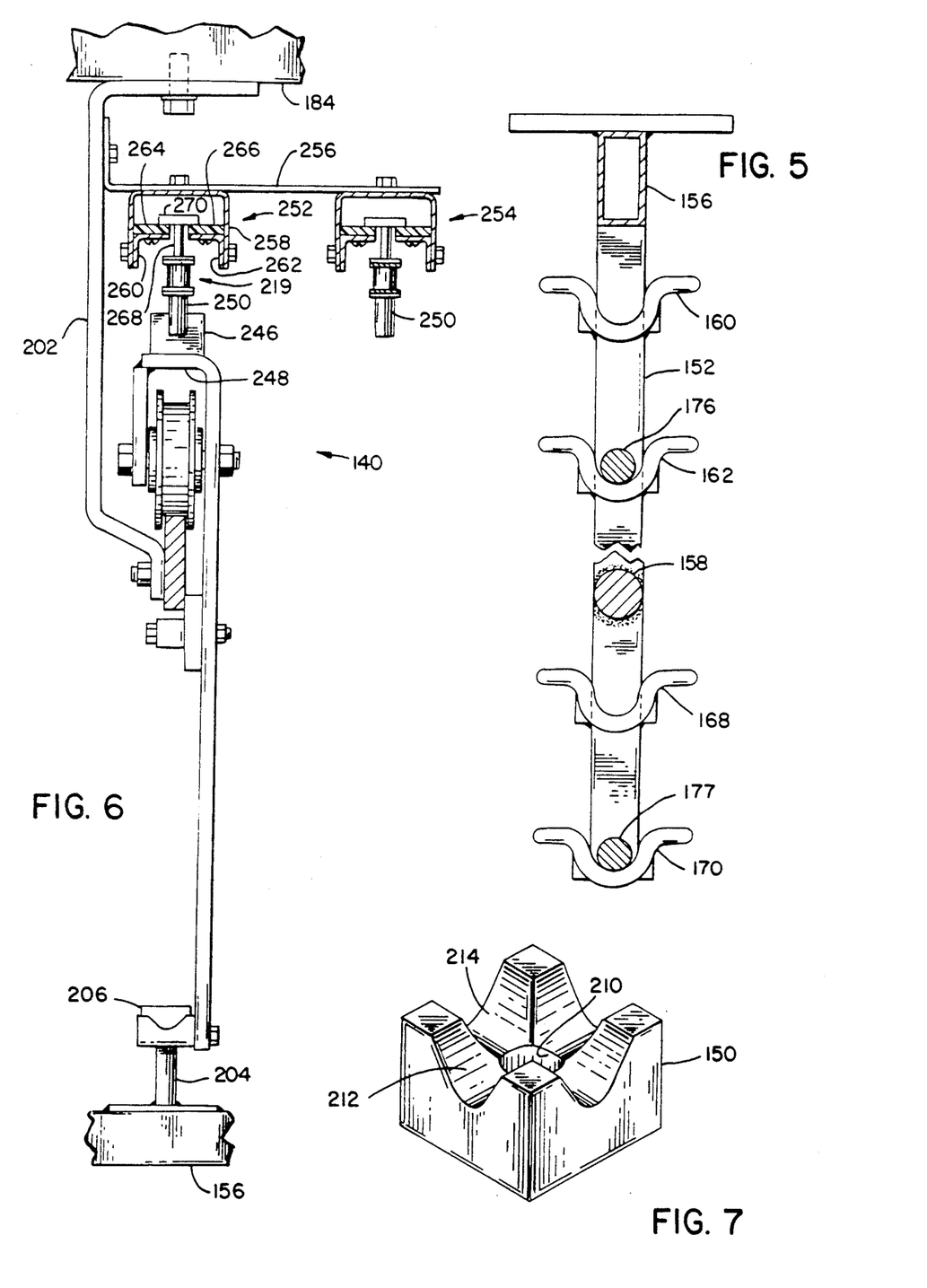
FIG. 5 is a partial sectional view taken generally along line 5—5 of FIG. 4.
FIG. 6 is an enlarged partial front elevation view of the chain drive system for advancing the product carriers on the rail.
FIG. 7 is an enlarged isometric view showing a base member adapted for interposition between the trolley assembly and the product carrier for allowing turning of the product carrier relative to the rail.

As shown in FIG. 5, each of brackets 160, 162, 168 and 170 comprises a generally U-shaped central portion in which the end of a product stick is received. Brackets 164, 166, 172 and 174 on vertical member 154 are similar in construction to brackets 160, 168 and 170 on vertical member 152.

With the construction of product tree 138 as shown and described, particularly with reference to brackets 160-174, loading of the loaded products sticks onto the brackets is easily performed due to the ability of tree 138 to receive a loaded product stick from either its right hand or left hand side, thus facilitating loading regardless of which side is presented to the operator during loading.

Referring again to FIG. 4, product tree 138 is shown passing through heat chamber 102, which is generally defined by a pair of spaced sidewalls 180, 182, an upper wall 184 and a lower wall 186. Air supply ducts 188, 190 receive heated air from ducts 192, 194, respectively, located above upper wall 184. A return air plenum defined by a left side portion 196 and a right side portion 198 is provided for exhausting air from the interior of heat chamber 102 through a duct 200.

A rail hanger 202 is connected at its upper end to the underside of upper wall 184, and at its lower end to rail 142, for spacing rail 142 a predetermined distance below wall 184.

Referring to FIGS. 4, 6 and 7, the upper cross member 156 of product tree 138 is provided with an upstanding member 204. Product tree 138 is suspended from trolley assembly 140 by means of a positioning pin 206 attached to upstanding member 204 by welding, with pin 206 engaging and being supported by base member 150 mounted to the lower end of vertical member 148.

Base member 150 includes a central passage 210 (FIG. 7) through which member 204 extends, and a pair of upwardly facing grooves or recesses 212, 214 formed in the upper surface of base member 150. Grooves 212, 214 extend throughout the entire width of base member 150, and grooves 212, 214 are substantially perpendicular to each other. Pin 206 is movable between grooves 212, 214 so as to selectively position product tree 138 relative to trolley assembly 140. Pin 206 is constructed with a curved lower surface corresponding to the curve of grooves 212, 214, which are angled appropriately for providing ease of movement of pin 206 between grooves 212, 214.

Figure 9:
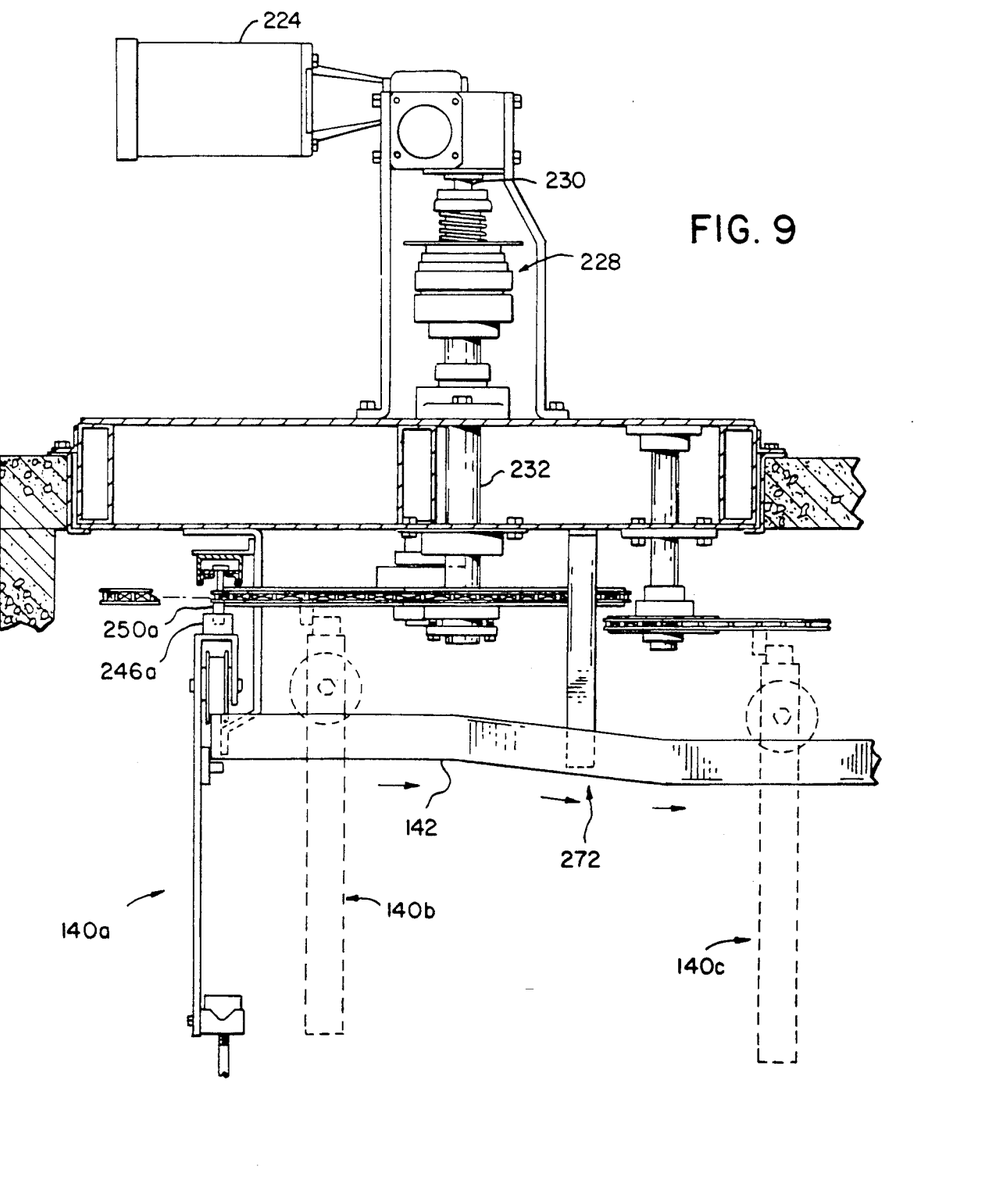
FIG. 9 is a partial sectional view taken generally along line 9—9 of FIG. 8.

FIGS. 8 and 9 show drive assembly 130 in detail, along with the downstream end of chain loop 114 and the upstream end of chain loop 116.

Referring to FIG. 8, loop 114 is defined by a chain 219 having a drive run 220 and a return run 222. Runs 220, 222, are disposed in a substantially horizontal plane, with chain 219 being on its side.

Drive assembly 130 includes a variable speed drive motor 224. The drive shaft of motor 224 drives a speed reducer 226 which provides power input to a torque limiter 228 (FIGS. 8, 9) through a speed reducer output shaft 230. A drive shaft 232 provides power output from torque limiter 228, and a drive sprocket 234 (FIG. 8) is driven by drive shaft 232. Drive chain 219 is trained around an idler sprocket 238, drive sprocket 234, and a spring-tensioned idler sprocket 236.

Downstream of loop 114 defined by drive chain 219 is a drive chain 240 defining loop 116, and including a drive run 242 and a return run 244.

As shown in FIG. 8, rail 142 extends below drive run 220 of drive chain 219, curving arcuately below idler sprocket 238 in a curve having a radius equal to that of idler sprocket 238, and below drive run 242 of drive chain 240. As noted previously, a series of rail hangers, shown at 202a and 202b, are provided for suspending rail 142 below the lower surface of upper wall 184.

At its upstream end, drive chain 240 is trained around an idler sprocket 246.

Referring briefly to FIG. 6, it is seen that a pusher plate 246 is connected to and extends upwardly from an upper cross member 248 extending between vertical members 146, 148 of trolley assembly 140. Drive chain 219 is provided with a series of evenly spaced engagement fingers 250 extending downwardly from its lowermost surface. Fingers 250 extend downwardly an amount sufficient to engage pusher plate 246 on trolley assembly 140.

A pair of chain guide assemblies, shown at 252, 254 are connected to the underside of a chain support member 256 connected to rail hanger 202. Guide assemblies 252, 254 are substantially identical in construction and operation. Referring to guide assembly 252, an inverted U-shaped bracket 258 has its upper transverse portion connected to support member 256. A pair of angles 260, 262 are connected to the inner surfaces of the legs of bracket 258, and a pair of plastic bearing members 264, 266 are connected to the upper surfaces of angles 260, 262, respectively. Plastic bearing members 264, 266 define a slot therebetween, and a series of chain hangers, one of which is shown at 268, are connected to the uppermost surface of drive chain 219 and extend through the slot between bearing members 264, 266. A support pin 270 is connected to the upper end of chain hanger 268, and has a length sufficient to span the gap between bearing members 264, 266. Chain hangers, such as 268, and support pins, such as 270, are provided at intermittent intervals along the length of drive chain 219, for providing adequate support to the chain to maintain it at a predetermined elevation. Engagement fingers 250 are mounted at predetermined intervals to the underside of the chain.

Chain guide assembly 254 functions in a manner similar to that of chain guide assembly 252.

Referring to FIG. 9, a series of trolley assemblies are shown at 140a, 140b and 140c. Trolley assembly 140a is shown as being advanced toward the viewer by engagement of an engaging finger 250a with a pusher plate 246a associated with trolley assembly 140a. Trolley assembly 140b is shown as having turned the corner in rail 142 below idler sprocket 238, and being advanced rightwardly. Trolley assembly 140c is shown as being engaged by an engaging finger associated with drive chain 240.

A downhill area, shown generally at 272, is provided in rail 142 in the space between idler sprocket 238 and idler sprocket 246. Drive run 220 of drive chain 219 advances the trolley assemblies onto downhill portion 272, and the trolley assemblies thereafter travel by gravity on downhill portion 272 into position in preparation for being picked up by downstream drive chain 240. In this manner, the trolley assemblies are essentially "handed off" from an upstream drive chain to a downstream drive chain, eliminating the necessity for a mechanical transfer device or the like. Rail 142 is preferably disposed at a very slight angle so as to compensate for elevation lost in downhill portion 272 of rail 142 between adjacent drive chains.

Figure 10:
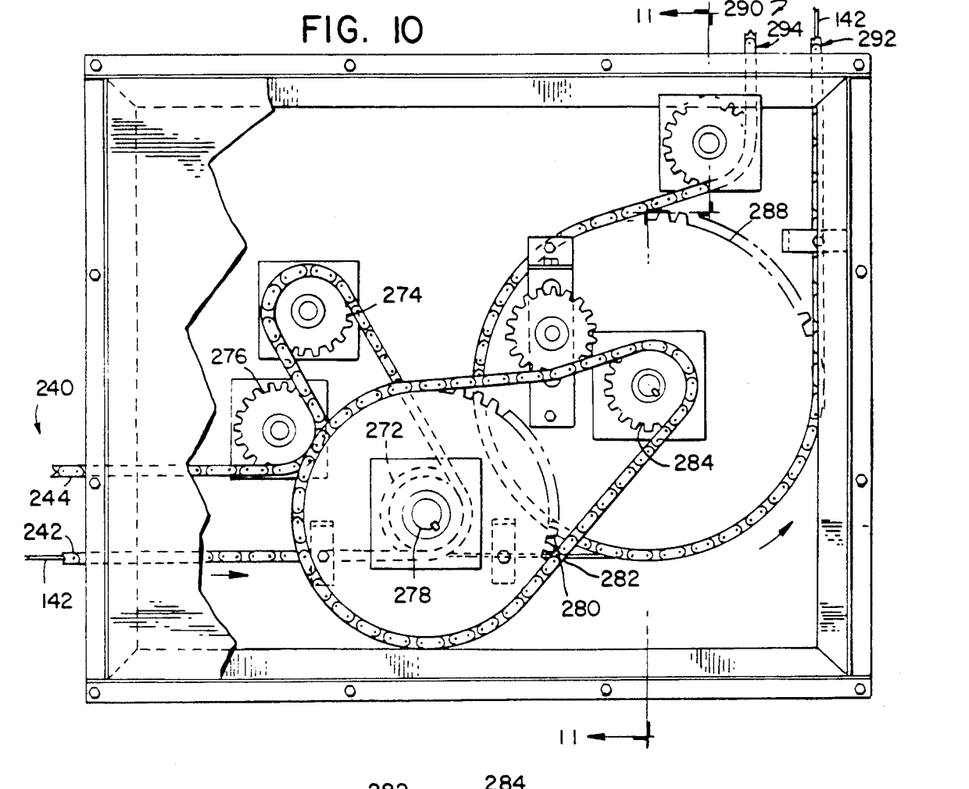
FIG. 10 is an enlarged plan view, with portions broken away, showing a transfer area between an upstream slow conveyor loop which advances the product carriers through a processing chamber, and a downstream fast conveyor loop which advances the product carriers between adjacent processing chambers.
Figure 11:
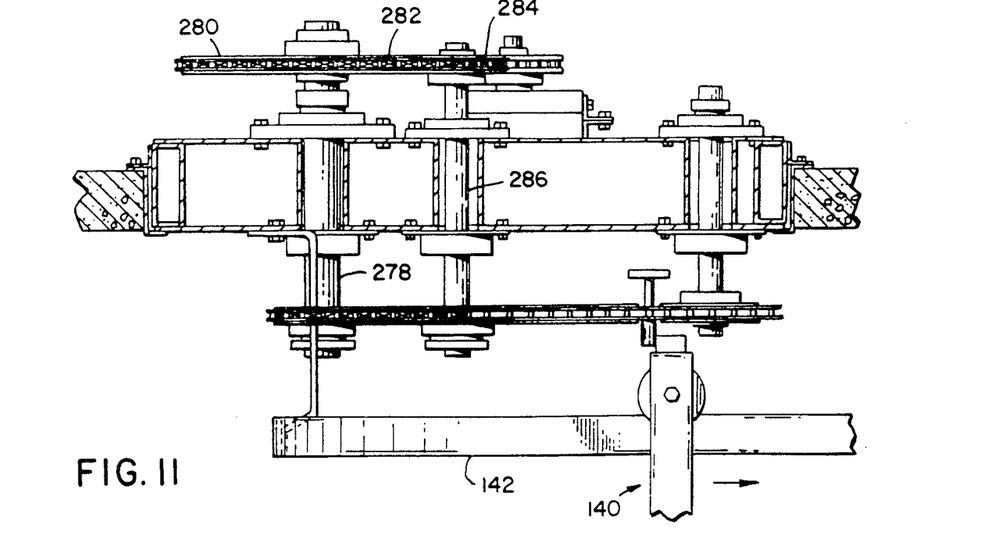
FIG. 11 is a section view taken generally along line 11—11 of FIG. 10.

FIGS. 10 and 11 illustrate the driving interconnection between conveyor loop 116 and conveyor loop 118. As noted previously, loop 116 is defined by a drive chain 240 having a drive run 242 and a return run 244. At its downstream end, drive chain 240 is trained around a lower sprocket 272, an idler sprocket 274, and an idler sprocket 276. Sprocket 272 is mounted to a shaft 278, which extends upwardly through the roof of heat chamber 104 and is connected to an upper sprocket 280. A chain 282 is trained around upper sprocket 280 and a sprocket 284, which is connected to a shaft 286. A lower sprocket 288 is fixed to the lower end of shaft 286, and a downstream drive chain 290 defining loop 118, and including a drive run 292 and a return run 294, is trained around lower sprocket 288. A drive assembly 132 (FIG. 3) is provided at the downstream end of loop 118 for driving chain 290. Through the chain and sprocket system as shown in FIGS. 10 and 11 and described above, movement of chain 290 is transferred through sprocket 288 to sprocket 284, and through chain 282 to sprocket 280 and shaft 278 to lower sprocket 272, for imparting movement to drive chain 240 in response to operation of drive assembly 132.

A downhill portion is formed in rail 142 between the downstream end of drive chain 240 and the upstream and of drive chain 290 for transferring the trolley assemblies therebetween, as described previously.

With the reduction arrangement achieved by the sprocket and chain assembly shown and described, a single drive assembly, such as 132, provides movement of chain 240 of loop 116 at a relatively slow rate of speed, while moving chain 290 defining loop 118 with a relatively fast rate of speed. The engagement fingers, such as shown at 250 in FIG. 6, are spaced relatively closely on drive chain 240, and are spaced relatively far apart on drive chain 290. This arrangement, in combination with the differential in chain speed provided by the reduction arrangement shown in FIG. 10, provides slow and densely packed movement of product carriers through the processing chambers, such as heat chambers 102 and 104 through which drive chain 240 extends. This concentration of product within the processing chamber optimizes utilization of the interior chamber space. The fast movement of loop 118, extending between the discharge of heat chamber 104 and the inlet of brine chamber 106, provides a rapid advancement of individual product carriers therebetween, thus allowing the number of product carriers passing a point during a given time interval to remain the same as within the processing chamber, even though the carrier spacing has increased.

Drive assemblies 130, 132, 134, 136 and 137 are constructed in the form of plug modules interchangeably mounted at the appropriate location in the system, for simplifying construction and installation of the system.

In operation, when the individual trolley assemblies are passed through the relatively narrow inlet into one of the processing chambers, the trolley assembly is forced to follow the path defined by rail 142. Once inside the processing chamber, rail 142 turns so as to be perpendicular to the entrance of rail 142 into the chamber. This turning of rail 142 while the trolley assembly is advanced therealong causes the product carrier to bump into the inside end wall of the chamber. This action forces positioning pin 206 out of the groove, such as 212, 214, associated with base member 150 in which it was positioned upon entrance into the chamber, and to move into the other of the grooves so as to orient the product carrier substantially perpendicularly to the longitudinal axis of the chamber for processing. At discharge from the processing chamber, substantially the same steps are reversed, with the product carrier bumping into the inside end wall of the processing chamber, causing the product carrier to turn relative to the trolley assembly in preparation for discharge from the processing chamber through the outlet formed in the chamber sidewall.

Various alternatives and embodiments are contemplated as being within the scope of the following claims particularly pointing out and distinctly claiming the subject matter regarded as the invention.

We claim:

1. A food product processing system, comprising:
   a plurality of processing chambers, each chamber having a product inlet and a product outlet, said chambers being isolated from each other such that the outlet of one of said chambers is spaced from the inlet of another of said chambers;
   a plurality of product carriers;
   rail means onto which said product carriers are movably mounted, said rail means defining a closed loop and being intertwined through said chambers and extending between the inlets and outlets thereof; and
   advancing means for advancing said product carriers on said rail means through said processing chambers and through the spaces between the inlets and outlets of said chambers, wherein said advancing means comprises: a series of chain drive loops, wherein each said chain drive loop comprises a drive chain having a drive run and a return run, said drive and return runs beings disposed in a substantially horizontal plane; engagement means interposed between said chain drive means and said product carriers for moving said product carriers along said rail means; and transfer means disposed between adjacent chain drive loops for transferring said product carriers from one loop to another, wherein at one location between two of said chain drive loops said transfer means comprises a downhill portion provided in said rail means at an area between said two chain drive loops, with said product carriers advancing by gravity along said downhill portion between the downstream end of one of said two loops and the upstream end of the loop adjacent thereto.

2. A food product processing system, comprising:
   a plurality of processing chambers, each chamber having a product inlet and a product outlet, said inlet and outlet being formed in a sidewall of each said chamber, said chambers being arranged in a non-linear fashion and being isolated from each other such that the outlet of one of said chambers is spaced from the inlet of another of said chambers;
   rail means defining a closed loop and being intertwined through said chambers and extending between the product inlets and product outlets thereof, said rail means being arranged so as to provide an entry portion at the product inlet of each said chamber disposed non-parallel to a longitudinal axis of said chamber; a processing portion disposed within said chamber substantially parallel to the longitudinal axis of said chamber; and a discharge portion at the product outlet of each said chamber disposed non-parallel to the longitudinal axis of said chamber;
   a plurality of product carriers movably mounted to said rail means, wherein each said product carrier includes a first portion movable on said rail means, a second portion carried by said first portion for carrying said product; and a turning arrangement disposed between said first and second portions of said product carrier for allowing each said product carrier to turn relative to said rail means after said carrier passes through a product inlet, and to turn prior to passage of said carrier through a product outlet; and
   advancing means for advancing said product carriers on said rail means through said processing chambers and through the spaces between the product inlets and product outlets of said chambers, wherein said advancing means advances the product carriers at a first relatively slow rate of speed to provide a first relatively close spacing of said carriers during advancement of said carriers along the processing portion of said rail means, and at a second relatively fast rate of speed through the space between the product outlet of one chamber and the product inlet of an adjacent chamber, to increase the spacing between said carriers to a second spacing greater than said first spacing during transport between the product outlet of one chamber and the product inlet of an adjacent chamber.

3. The system of claim 2, wherein said rail means is mounted overhead, and wherein the first portion of each said product carrier comprises a wheeled trolley mounted for rolling movement to said rail means, and wherein said second portion of each said carrier functions to suspend product from each said wheeled trolley.

4. The system of claim 2, wherein said advancing means comprises chain drive means, and engagement means interposed between said chain drive means and said product carriers for moving said product carriers along said rail means in response to operation of said chain drive means.

5. The system of claim 4, wherein said engagement means comprises an upstanding member provided on each said product carrier, and a series of spaced depending fingers provided on said chain drive means, each said finger being adapted to engage one of said upstanding members.

6. The system of claim 4, wherein said chain drive means comprises a series of chain drive loops, and further comprising transfer means disposed between said chain drive loops for transferring said product carriers from one loop to another.

7. The system of claim 6, wherein each said chain drive loop comprises a drive chain having a drive run and a return run, said drive and return runs being disposed in a substantially horizontal plane.

8. The system of claim 7, further comprising chain support means for supporting said drive and return runs of said drive chain at a predetermined elevation.

9. The system of claim 8, wherein said chain support means comprises a series of chain hangers connected to and extending from the upper portion of said drive chain, and track means including a slot through which said chain hangers extend, and support means movable along said track means for supporting said chain at said predetermined elevation.

10. The system of claim 2, wherein said turning arrangement comprises a pivotable connection by which the lower portion of said carrier is suspended from the upper portion of said carrier, for allowing pivoting movement of said lower portion relative to said upper portion.

11. The system of claim 10, wherein said pivotable connection comprises a positioning base member mounted to said carrier upper portion and including a pair of lateral recessed areas oriented substantially perpendicular to each other, and a lateral positioning pin mounted to said carrier lower portion, said pin being movable between said lateral recessed areas for orienting said carrier lower portion relative to said rail.

12. A method of processing a food product carried on a plurality of individual product carrier, comprising the steps of:

providing a plurality of processing chambers, each chamber including at least one sidewall, and further including an inlet formed in a sidewall and an outlet formed in a sidewall;

arranging said chambers such that said chambers are isolated from each other and the outlet of one of said chambers is spaced from the inlet of an adjacent chamber;

providing a first relatively close spacing of the product carriers within the plurality of processing chambers and simultaneously advancing the product carriers at a first relatively slow rate of speed through the processing chambers; and providing a second spacing greater than the first spacing of the product carriers upon discharge of the carriers from the chamber outlets and simultaneously advancing the product carriers through the space between the chamber outlets and the inlets of adjacent chambers at a second relatively fast rate of speed;

wherein the step of advancing the food product through the plurality of processing chambers comprises providing a plurality of individual product carriers and an overhead rail, wherein the rail extends through the processing chambers and between adjacent chambers, and wherein the rail within each chamber changes direction relative to the longitudinal axis of the chamber adjacent the chamber inlet and adjacent the chamber outlet; mounting the product carriers for movement to the overhead rail; and advancing the individual product carriers along the overhead rail by passing the food product carriers through the inlet to each chamber such that the carriers extend along an axis substantially perpendicular to the longitudinal axis of the chamber, turning the carriers relative to the overhead rail after entry into the processing chamber such that the product carrier remain substantially perpendicular to the rail during passage through the processing chamber, and subsequently turning the product carriers relative to the rail immediately prior to passage of the carriers through the outlet of each chamber.

13. The method of claim 12, wherein the step of arranging the processing chambers comprises positioning adjacent chambers such that the outlet from an upstream chamber is substantially aligned with the inlet to the chamber immediately downstream therefrom.

14. The method of claim 12, wherein the plurality of processing chambers includes an initial chamber and a final chamber, and wherein the rail is arranged so as to extend between the final chamber and the initial chamber, and to pass by an unloading area adjacent the final processing chamber, and thereafter by a loading area adjacent the inlet of the initial processing chamber, and wherein the carriers are advanced past said loading and unloading areas at said second relatively fast rate of speed.

15. The method of claim 14, wherein each product carrier includes an upper product carrying area and a lower product carrying area, and further comprising the step of providing a rail having a varying elevation adjacent the loading and unloading areas to accommodate loading and unloading of product onto and from the upper and lower product carrying areas.

* * * * *